2,932,659
ORGANIC ALUMINUM COMPOUNDS AND A PROCESS OF PREPARING THEM

Ludwig Orthner and Martin Reuter, Frankfurt am Main, Germany, assignors to Farbwerke Hoechst Aktiengesellschaft vormals Meister Lucius & Bruning, Frankfurt am Main, Germany, a corporation of Germany No Drawing. Application May 21, 1954
Serial No. 431,589

Claims priority, application Germany May 26, 1953

14 Claims. (Cl. 260—414)

The present invention relates to organic aluminum compounds and a process of preparing them.

From German Patent No. 569,946 it is known to react aluminum alcoholates with carboxylic acids in various proportions, and subsequently to hydrolyze the reaction products with water. In this way well defined primary, secondary and tertiary aluminum carboxylates are obtained. In the preparation of the primary and secondary salts of the formulae

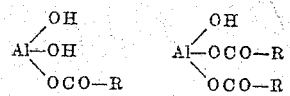

the corresponding mono- and di-carboxylic acid aluminum alcoholates of the formulae

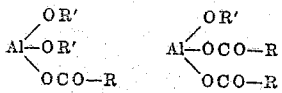

are presumably formed at first. In the subsequent treatment with water the alkoxy groups are replaced by hydroxyl groups.

It has also been proposed to prepare organic aluminum compounds by reacting 1 mol of an organic aluminum compound containing, per equivalent of aluminum, up to 1 equivalent and less of an organic radical bound in an ether-like manner with less than 1 mol of a monobasic organic substance of acidic character capable of forming aluminum salts or mixtures of such substances, advantageously in the presence of inert solvents and, if desired, by stabilizing the reaction products against destruction due to moisture by means of volatile organic compounds capable of forming complex compounds.

In this reaction in which most probably equivalent quantities of the most volatile radical attached to the aluminum are displaced, aluminum compounds are formed in which the aluminum atoms may be linked in chain fashion or cross-linked to a more or less high degree according to the kind of starting material used and the reaction temperatures applied. Depending on the proportions used, the starting material and the reaction temperatures applied, the reaction products still contain quantities of radicals bound in an ether-like manner.

Now, we have found that valuable new organic aluminum compounds are obtained by reacting organic aluminum compounds containing, per equivalent of aluminum, up to 1 equivalent of organic radicals bound in an ether-like manner with aluminum salts of monobasic organic substances of acidic character in the presence or absence of inert organic solvents and, if desired, rendering the reaction products stable against destruction due to humidity by means of volatile organic compounds, capable of forming complex compounds.

The novel process can also be carried out by conducting the reaction at a low temperature, if desired, with only a part of the components and then heating the reaction product to a higher temperature, for instance, to about 50° C.–about 200° C., if desired, with the addition of the remainder of the components. Alternatively, the entire reaction may be carried out at a higher temperature.

In this case a mutual exchange between the acyl and alkoxy radicals bound to the different aluminum atoms take place, the reaction products being, to a certain extent, linked in chain fashion or cross-linked according to the temperatures and the starting material applied. Particularly valuable reaction products are obtained by reacting 1 mol of aluminum alcoholate with about 1/10–1 mol of tertiary aluminum salts of fatty acids of high molecular weight or with 1/3–2 mols of mixed tertiary aluminum salts obtained from about 0.5 to about 1.5 mols of difficultly volatile fatty acids of high molecular weight and 1.5–2.5 mols of easily volatile fatty acids of low molecular weight or with about 1/3 to about 2 mols of basic approximately primary to secondary aluminum salts of high molecular weight fatty acids.

The reaction products have an oily to semi-solid or a waxy or resin-like consistency. They are soluble in many organic solvents and compatible with plasticizers. They can be used on an industrial scale for many purposes, for instance in the lubricant fuel and lacquer or varnishes industries; they are especially suitable for imparting water-repellent properties to fibrous materials in organic solvents, advantageously in the presence of hydrophobic organic substances of high molecular weight. The very large number of aluminum salts of monobasic organic acid substances and of aluminum alcoholates enables the components to be selected so as to form aluminum compounds having properties favorable for the purposes for which they are to be used.

Suitable organic aluminum compounds which contain, per equivalent of aluminum, up to 1 equivalent of organic radicals bound in an ether-like manner include principally aluminum alcoholates derived from aliphatic alcohols of low or medium molecular weight. There may be mentioned for instance: aluminum methylate, aluminum ethylate, aluminum propylate, aluminum isopropylate, aluminum butylate, aluminum isobutylate, aluminum amylate, aluminum hexylate, aluminum-octylate, aluminum-2-ethyl-butylate, aluminum-2-ethyl-hexylate, or the like. Instead of the single alcoholates also mixtures thereof or mixed aluminum alcoholates may be used.

As an aluminum alcoholate which can be successfully employed in practicing the invention there may further be mentioned the so-called alpha-aluminum ethylate. The latter is ready soluble in organic solvents and can be obtained according to Adkins (Journal of the American Chemical Society, vol. 44, page 2178) from amalgamated aluminum by means of absolutely anhydrous ethanol or, according to Child and Adkins (Journal of the American Chemical Society, vol. 45, page 3014) by heating sparingly soluble β-aluminum ethylate for 15 hours at 275° C.

Suitable alcoholates further include aluminum enolates, for instance aliphatic keto-enol-compounds such as aluminum-tri-acetoacetic ester, aluminum-tri-acetyl-acetone.

Furthermore, there may be mentioned such aluminum alcoholates as contain, per equivalent of aluminum, less than 1 equivalent of organic radicals which are bound in an ether-like manner through oxygen. As such radicals there come into consideration aliphatic, alicyclic, aromatic, araliphatic and heterocyclic hydrocarbon radicals, which, if desired, may be substituted by non-acid groups, such as keto or ester group, halogen atoms such as chlorine atoms, or amino-groups, or the carbon chains of which may be interrupted by heteroatoms such as oxygen, sulfur or nitrogen. There may be mentioned, for instance: methyl, ethyl, chlorethyl, dimethyl, aminoethyl, isopropyl, butyl, octyl, octadecyl, cyclohexyl, phenyl, naphthyl, benzyl, phenylethyl, furfuryl-methyl, and the like. Several different radicals of the above kind may be bound simultaneously to the aluminum. Especially useful aluminum alcoholates are those which contain, per equivalent of aluminum, about 0.5–about 0.9 equivalent of radicals bound in ether-like manner. The remaining valences of the aluminum, that is to say, those which are not bound through oxygen in ether-like manner to organic radicals may be satisfied, for example, by oxygen linked in chain-fashion to further aluminum atoms, or by halogen atoms, hydroxyl groups or organic acid residues such as acetyl, and a plurality of the same or different radicals of the kind mentioned above may satisfy the remaining valences of the aluminum.

As aluminum alcoholates which contain per equivalent of aluminum, less than 1 equivalent of radicals bound through oxygen in ether-like manner, there may be mentioned, for instance, those of which the solubility in organic solvents has been improved by the thermal or hydrolytic treatment of normal aluminum alcoholates accompanied by the splitting off of a part of the alkoxy groups, in most cases probably with the linking together of aluminum atoms in chain fashion through oxygen atoms.

Among these aluminum alcoholates there may be mentioned, for example, the aluminum ethylates obtained by thermal treatment and corresponding to the emperical molecular formulae $Al_2(OC_2H_5)_4O$ and $Al_4(OC_2H_5)_6O_3$ as described by Henle (Berichte der deutschen chemischen Gesellschaft, vol. 53, page 720); the aluminum ethylate obtained by hydrolytic treatment, as described in German patent specifications Nos. 277,187 and 277,188, and containing about 2 ethoxy radicals per atom of aluminum; the basic aluminum ethylate of the empirical molecular formula $Al(OH)(C_2H_5O)_2$ obtained by boiling with anhydrous alcohol with the access of air, as described by Meerwein and Bersin ("Annalen," vol. 476, page 132); the aluminum dihydroxy-cyclohexanolate obtained as described by Meerwein and Bersin ("Annalen," vol. 476, page 132) by heating aluminum cyclohexanolate at 275° C.; the basic aluminum ethylate obtained as described by Bersin (dissertation Königsberg, 1928) by boiling with incompletely anhydrous ethanol and containing about 2 ethoxy groups per atom of aluminum. There may be also mentioned those aluminum alcoholates which can be obtained from aluminum alcoholates by reaction with slightly hydrous alcohols according to the process described by Tischtschenko (Chem. Zentralblatt, 1900, vol. 1, page 12).

There may be also used those readily soluble aluminum alcoholates which are obtained by the reaction of metallic aluminum with slightly hydrous alcohols, advantageously in the present of activating agents, and which contain, per equivalent of aluminum, about 0.5 to about 0.8 alkoxy groups.

As aluminum alcoholates containing halogen atoms there may be mentioned, for instance: readily soluble aluminum alcoholates containing halogen corresponding, for instance to the formulae $AlHal(OR)_2$ or $$Al_2Hal_3(OR)_3$$

wherein R represents a lower aliphatic radical, such as $AlCl(OC_2H_5)_2$, and obtainable by reacting an aliphatic alcohol with aluminum chloride as described by Mpetse (Chemisches Zentralblatt, 1931, vol. II, page 1691).

Readily soluble aluminum alcoholates of the above kind containing halogen can also be obtained by the process described in German patent specification 859,143 by reacting a theoretically insufficient quantity of an alcohol with an aluminum halide in the presence of ammonia or an amine. Furthermore, there may be mentioned aluminum alcoholates containing halogen corresponding to the formula $AlHal_n(ORHal)_m$ ($n+m=3$, $n=0$–$2$, $m$ being at least 1 and R representing an alkylene radical). These substances can be obtained by reacting aluminum halides with alkylene oxides. For example the compound $AlCl(OC_2H_4Cl)_2$ can be obtained by reacting 2 mols of ethylene oxide with aluminum chloride.

In halogenated aluminum alcoholates of the above kind, part of the radicals bound in ether-like manner may be split off by thermal or hydrolytic after-treatment; it is probable that in most cases the aluminum atoms are linked together in chain fashion through oxygen bridges.

Furthermore, there may be mentioned aluminum compounds obtainable by the thermal and/or hydrolytic treatment of carboxylic acid aluminum dialcoholates accompanied by the partial splitting off of alkoxyl radicals, probably with the formation of chains of aluminum atoms linked through oxygen atoms. In this manner there are obtained, for example, carboxylates of complex aluminum alcoholates of the empirical molecular formula $$AlAc_x(OR)_yO_z \text{ (R=alkyl, Ac=acyl)}$$

in which the sum of $x$ and $y$ and $z$ is 2.5 to 3, for instance 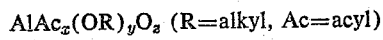

There may also be used mixtures of aluminum alcoholates having a reduced content of alkoxy or mixtures of these alcoholates with normal aluminum alcoholates containing 3 alkoxy groups.

Instead of the aluminum alcoholates there may be used for the preparation of the solutions of the aluminum alcoholates the products obtained by the additive combination of carbon dioxide or sulfur dioxide with the aluminum alcoholates. (Compare Tischtschenko, Chemisches Zentralblatt 1900, vol. 1, page 585.) The said addition products are advantageously used whenever they are more stable during storage than the alcoholates themselves. When the addition compounds are dissolved in inert solvents, especially with the aid of heat, carbon dioxide or sulphur dioxide splits off and the alcoholates are regenerated.

The aluminum alcoholates may also be used in the form of their alkoxo-acids and/or in a form stabilized against moisture by means of volatile organic substances capable of forming complex compounds.

As monobasic organic substances of acidic character capable of forming salts with aluminum there may be mentioned, for example: monocarboxylic acids, monosulfinic acids, monosulfonic acids, monosulfuric acid esters, monosulfamic acids, monobasic phosphonic acids, monobasic phosphoric acid esters, diacylamides containing carboxyl and/or sulfonyl residues or mixtures thereof.

These compounds may belong to the aliphatic, alicyclic, aromatic and heterocyclic series and may contain additional inert substituents of a neutral character, for instance halogen atoms or radicals such as the groups OH or SH or ether, thioether or ester groups, carboxylic acid amide or urea groups or the like. Their carbon chain may be interrupted by hetero-atoms such as oxygen, nitrogen or sulphur.

As aliphatic monocarboxylic acids may be mentioned, for example: formic acid, acetic acid, propionic acid, butyric acid, caproic acid, caprylic acid, capric acid, lauric acid, myristic acid, palmitic acid, stearic acid, oleic acid, behenic acid, montanic acid, mixtures of fatty acids obtained by the oxidation of paraffin wax or resin acids, such as abietic acid or colophony. Instead of the single acids there may be used mixtures of the said acids or mixtures of acids which are obtained from natural, and, if desired, hydrogenated products. Mixtures of this kind are, for instance, the fatty acids of sperm oil, coconut oil, tall oil, linseed oil, soy bean oil, fish oil, cottonseed oil, train oil, peanut oil, sulfocarbon oil, rape oil, tallow animal oil, bone fat, lard or tung oil.

Furthermore, there are mentioned, for instance: acrylic acid, methacrylic acid, crotonic acid, methoxyacetic acid, ethoxyacetic acid, butoxyacetic acid, dodecyloxyacetic acid, chloroacetic acid, alpha-chloropropionic acid, beta-chloropropionic acid, alpha-chlorobutyric acid, thioglycollic acid, thiolactic acid, malonic acid monoethyl ester, oxalic acid monoethyl ester, the semi-amide of malonic acid, hydantoic acid, glycollic acid, lactic acid, beta-hydroxy-butyric acid, maleic acid monoethyl ester or propyl-sulfonamido-acetic acid, dodecylsulfonamido-acetic acid and mixtures of aliphatic alkylsulfonamido-acetic acids. As alicyclic monocarboxylic acids may be used, for instance: cyclopentane-carboxylic acid, cyclo-hexane-carboxylic acid, hexahydrosalicyclic acid or analogous acids.

As aromatic monocarboxylic acids there may be mentioned, for instance: benzoic acid, ortho-chlorobenzoic acid, 4-chlorobenzoic acid, 2 methyl-benzoic acid, 3-methyl-benzoic acid, 4-methyl-benzoic acid, alpha-naphthoic acid, beta-naphthoic acid, alpha-naphthoxy-acetic acid, beta-naphthoxy-acetic acid, phenyl-acetic acid, cinnamic acid, phthalic acid monoethyl ester, salicyclic acid, 2:3-hydroxynaphthoic acid, 3-hydroxybenzoic acid, 4-hydroxybenzoic acid, methoxy-benzoic acid, phenoxy-acetic acid, 2:4 dichloro-phenoxy-acetic acid, the semi-amide of phthalic acid, para-toluene-sulfamido-acetic acid and the like.

As heterocyclic mono-carboxylic acids may be mentioned, for example: pyromucic acid, nicotinic acid, thiophene-alpha-carboxylic acid, 2-hydroxy-carbazole-3-carboxylic acid, 3-hydroxy-diphenylene oxide-2-carboxylic acid, 1-phenyl-5-pyrazolone-3-carboxylic acid, 5-benzoyl-benzoxazolone-2-carboxylic acid, 3-hydroxy-2-methyl-quinoline-4-carboxylic acid, pyrrole-alpha-carboxylic acid, beta-indolyl acetic acid.

Furthermore, mono-basic diacylamides of carboxylic acids, such as diacetamide, dilaurylamide, dibenzamide, phthalimide, may also be used for the reaction with the aluminum alcoholate.

As organic mono-sulfinic acids there enter into consideration, for instance: the sulfinic acids of ethane, propane, dodecane, cyclohexane, benzene.

As organic mono-sulfonic acids there may be mentioned, for example: propane sulfonic acid, dodecane sulfonic acid, cyclohexane sulfonic acid, benzene sulfonic acid, para-toluene sulfonic acid, naphthalene sulfonic acid, octylbenzene sulfonic acid, butylnaphthalene sulfonic acid, hydroxyethane sulfonic acid, phenol sulfonic acid, naphthol sulfonic acid, 2-hydroxy-carbazole-7-sulfonic acid, thiophene-alpha-sulfonic acid.

There may, furthermore, be used the mono-basic amides and imides of sulfonic acids of the said kind, such as dodecane sulfonamide, benzene sulfonamide, para-toluene sulfonamide, benzene disulfimide, para-toluene disulfimide, dodecane disulfimide, propane sulfonamide, propane disulfimide.

There can also be applied, for instance, the mono-basic sulfinic and sulfonic acids, the sulfonamides and sulfimides from mixtures of hydrocarbons of medium or high molecular weight which can be obtained, for example, by known methods from the sulfochlorides of fossil and synthetic Diesel oils or by sulfonation of petroleum distillates and alkyl-benzenes.

As mono-sulfuric acid esters are mentioned, for instance: monoethyl-sulfuric acid ester, mono-butyl-sulfuric acid ester, mono-dodecyl-sulfuric acid ester, mono-stearyl-sulfuric acid ester, monobenzyl-sulfuric acid ester, monocyclohexyl-sulfuric acid ester, monophenyl-sulfuric acid ester, monoalkylphenyl-sulfuric acid ester.

As monobasic organic sulfamic acids may be mentioned, for example: ethyl-sulfamic acid, dodecylsulfamic acid, cyclo-hexyl-sulfamic acid and phenyl-sulfamic acid.

There also come into consideration monobasic acid cyclic imides, for example: benzoic acid sulfimide, barbituric acid, ethyl-barbituric acid.

As monobasic phosphonic acids there may be used, for instance: the mono-esters of phosphonic acids with aliphatic or alicyclic alcohols, such as cyclohexane phosphonic acid monoethyl ester of the formula $$C_6H_{11}PO(OC_2H_5)OH$$

and the corresponding amyl ester, the ethyl, amyl, dodecyl or cyclohexyl ester of hexane phosphonic acid, or the ethyl, butyl, dodecyl or cyclohexyl ester of phenyl-phosphonic acid. As monobasic phosphoric acid esters there may be mentioned, for example, the dialkyl esters of phosphoric acid of the formula $PO(OR)_2OH$ such as the diethyl, dibutyl, diamyl, didodecyl, dibenzyl, dioctadecyl or dicyclohexyl ester of phosphoric acid.

Especially valuable products, namely products which are to a considerable extent stable to moisture, especially at ordinary temperature, are obtained by treating the reaction products with a voltatile organic compound capable of forming complex compounds. The volatile organic compounds capable of forming complex compounds may be added before or during the reaction of the alcoholates with the aluminum salts. The products so obtained are stable to atmospheric humidity and water at low temperatures. Reaction products obtained from aluminum alcoholates and aluminum salts and stabilized to a considerable extent can, under some circumstances, be used even in an aqueous medium without hydrolytic splitting taking place at low temperatures. The above mentioned substances capable of forming complex compounds are advantageously added in the liquid or the dissolved state at ordinary or a raised temperature in a proportion ranging from about 0.1 to 2 mols depending on the degree of stabilization desired.

As volatile organic compounds capable of forming complex compounds there may be mentioned, for example: compounds containing a feebly acid group, for instance, aliphatic hydroxy-carboxylic acid esters such as tartaric acid diethyl ester, or oximes, for instance, acetoxime and aldoxime; furthermore, such compounds containing a group capable of desmotropic rearrangement to the aciform, for instance, acetyl-acetone, ethyl aceto-acetate, malonic acid dinitrile, nitromethane, nitropropane and the like; furthermore, compounds containing a reactive methylene group, for instance, malonic acid esters; hydroxy-oxo-compounds such as butyroin and aliphatic nitriles such as acetonitrile.

As inert solvents there may be used hydrocarbons or chlorinated hydrocarbons such as benzine, benzene, xylene, carbon tetrachloride, trichlorethylene, perchlorethylene, chlorobenzene, and also esters of low boiling point such as ethyl acetate, amyl acetate. Also ethers, such as dialkyl ethers or cyclic ethers for instance diethyl ether, dioxane or the like come into consideration.

Reference is made to copending patent application Serial No. 398,642, now U.S. Patent No. 2,877,248 and to U.S. Patents 2,838,422 and 2,844,551.

The following examples serve to illustrate the invention but they are not intended to limit it thereto, the parts being by weight unless otherwise stated and the relationship of parts by weight to parts by volume being the same as that of the gram to the litre:

*Example 1*

185 parts of aluminum-diacetate-monostearate and 40 parts of aluminum isopropylate in 1000 parts of xylene are boiled for 2 hours under reflux. The solvent is distilled off from the clean solution, finally under reduced pressure. The aluminum compound thus obtained is a soft resin soluble in perchlorethylene and xylene.

For use as an agent imparting water repelling properties, 12 parts of the resin and 12 parts of paraffin (solidification point 54° C.) are dissolved in 1600 parts of perchlorethylene. With this solution fibrous materials, for instance dry cleaned outer garments of cotton poplin, woolen gabardine or polyamide fibres are impregnated at about 20° C. for 15 minutes in a washing machine suitable for dry cleaning at a goods-to-liquor ratio of about 1:20. After impregnation, the goods are centrifuged in the same machine until an increase in weight of about 50% is reached, then they are dried by means of hot air of about 90° C. and ironed, if necessary. This treatment imparts very good water repellent properties to the goods. If the impregnation is carried out without addition of paraffin wax a minor water repellent effect is obtained which is suitable for reducing the absorptivity of fibrous material of regenerated cellulose, for instance fabrics of staple fibres of regenerated cellulose. By the same procedure, but using, instead of stearic acid the equivalent amount of fatty acid from sperm oil or instead of glacial acetic acid the equivalent quantity of propionic acid for preparing the aluminum salts and reacting the latter in the same way with aluminum isopropylate, soft resin-like aluminum compounds are likewise obtained which are soluble in perchlorethylene and xylene and which, too, are suitable for imparting water-repellent properties to the fibres.

Example 2

50 parts of basic aluminum stearate of about the analytical composition $Al(C_{18}H_{35}O_2)_{1.6}(OH)_{1.4}$ prepared by reaction of aluminum sulfate with sodium stearate in an aqueous medium are boiled with 60 parts of aluminum isopropylate in 1000 parts of xylene for 1 hour under reflux. The solvent is distilled off from the clear solution obtained, finally under reduced pressure. The resulting aluminum compound is a viscous oil, which solidifies, on cooling to a wax-like consistency and is soluble in aromatic and aliphatic hydrocarbons.

For use as an agent imparting water repellent properties, 10 parts of the oily aluminum compound, 10 parts of paraffin wax and 10 parts of paraffin slack wax are dissolved in 700 parts of solvent benzine or in 1600 parts of carbon tetrachloride and stabilized against decomposition due to humidity by the addition of 1 part of acetylacetone at ordinary temperature. With this impregnating solution muslin fabrics of regenerated cellulose are impregnated in a standing bath for 15 minutes at about 50° C. and at a goods-to-liquor ratio of 1:15. The impregnated fabrics are squeezed in a wringing machine, the increase in weight after the squeezing off amounting to about 130% of the goods. Subsequently the goods are air-dried at ordinary temperature. In this manner, the absorptivity is reduced to about one tenth and a good water-repellent effect is obtained. This effect is still increased if the fabrics are additionally heated for 30 minutes in a drying cabinet by means of hot air of about 120° C.

By the same procedure, but using instead of aluminum-isopropylate 48 parts of aluminum ethylate, a thick oily reaction product is likewise obtained which solidifies in a waxlike manner at low temperature and is soluble in perchlorethylene and xylene and which is excellently suitable for being used as a water-repellent agent.

Example 3

68 parts of aluminum isopropylate, and 140 parts of aluminum-tri-stearate (obtained in a known manner by reacting aluminum butylate with 3 mols of stearic acid according to the process described in the German patent specification 569,946 and distilling off of the butyl-alcohol) are melted at about 130° C., while stirring, and heated for one hour at about 135° C. to about 140° C. On cooling, the thick oily fused mass solidifies to a product of soft rubber-like consistency and is soluble in xylene.

For use as an agent imparting water repellent properties, 100 parts of a stock solution containing 10% of the product dissolved in xylene, are diluted with 1600 parts of carbon tetrachloride in which 10 parts of paraffin wax have been dissolved. Then the poplin fabric of cotton is impregnated on the foulard at about 20° C. with this bath. After having passed the impregnating bath, the goods are squeezed until an increase in weight of about 80% is reached and finally dried by means of hot air of about 100° C. having a relative content of humidity of about 30%. The fabrics have now very good water repelling properties.

By the same procedure, but adding 30 parts of chloroparaffin (chlorine content=40%) the fabrics become difficultly combustible.

Example 4

100 parts of aluminum-butylate and 80 parts of aluminum-tribenzoate are made into a thick paste which is heated, while stirring, to 180° C., the fused mass being obtained as a clear, viscous oil. On cooling, the reaction mixture solidifies in the form of a soft resin readily soluble in xylene and benzene.

When proceeding in the same manner but using only 30 parts of aluminum-tribenzoate, the fused mass is also obtained as a clear, viscous oil, solidifying in the form of a soft wax readily soluble in benzene and xylene.

When proceeding in the same manner but using, instead of aluminum tribenzoate, 80 parts of aluminum-tri-(12-hydroxystearate), a viscous fused mass is obtained which solidifies in the form of a wax soluble in xylene.

Example 5

204 parts of aluminum-isopropylate are boiled with 244 parts of benzoic acid in 1000 parts of xylene, while stirring, whereby the aluminum-mono-isopropylate-dibenzoate formed is split off. The xylene solution, which in addition to the isopropanol split off contains only traces of aluminum compounds and benzoic acid is drawn off. Then 612 parts of aluminum isoproplate are added and the whole is fused at about 200° C. After a further heating for 2 hours, while stirring, a clear fused mass having the consistency of a viscous oil is formed from the aluminum mono-isopropylate-dibenzoate and the subsequently added aluminum isopropylate. This melt solidifies in the cold to a product of wax-like consistency. The wax shows the approximate analytical composition of a semi-benzoate of aluminum-isopropylate and is soluble in xylene.

Example 6

102 parts of aluminum-isopropylate and 284 parts of stearic acid in 500 parts of xylene are heated to 100° C., while stirring, whereby the aluminum-mono-isopropylate-distearate is formed with splitting off of isopropanol. Then the solvent is distilled off at about 100° C., finally under reduced pressure, and to the oily residue 306 parts of aluminum-isopropylate are added at 100° C., while stirring. The fused mass is subsequently heated for one hour at 130° C. The reaction product is obtained in the form of an oil having the approximate analytical composition of a semi-stearate of aluminum-isopropylate and being soluble in aliphatic and aromatic hydrocarbons and chlorinated hydrocarbons.

The same result is obtained if, at first, 204 parts of aluminum-isopropylate are reacted with 284 parts of stearic acid and, in the second phase, the condensation is continued with only 204 parts of aluminum-isopropylate.

We claim:
1. The process for acylating an aluminum trialcoholate which comprises heating to a temperature ranging from about 50° to 200° C. a mixture of an aluminum trialcoholate of an alcohol of an aliphatic hydrocarbon having up to 4 carbon atoms and a member of the group consisting of aluminum tricarboxylates and basic aluminum carboxylates of at least one carboxylic acid selected from the group consisting of monobasic carboxylic acids of aliphatic hydrocarbons having up to 18 carbon atoms, monohydroxy substituted monobasic carboxylic acids of aliphatic hydrocarbons having up to 18 carbon atoms, and benzoic acid, the molar ratio of aluminum tricarboxylate to aluminum trialcoholate being between about 0.1:1 and 1:1, and the molar ratio of basic aluminum carboxylate to aluminum trialcoholate being between about 0.33:1 and 2:1.

2. The process for acylating an aluminum trialcoholate which comprises heating to a temperature ranging from about 50° to 200° C. a mixture of an aluminum trialcoholate of an alcohol of an aliphatic hydrocarbon having up to 4 carbon atoms and an aluminum tricarboxylate of a monobasic carboxylic acid of an aliphatic hydrocarbon having up to 18 carbon atoms, the molar ratio of aluminum tricarboxylate to aluminum trialcoholate being between about 0.1:1 and 1:1.

3. The process for acylating an aluminum trialcoholate which comprises heating to a temperature ranging from about 50° to 200° C. a mixture of an aluminum trialcoholate of an alcohol of an aliphatic hydrocarbon having up to 4 carbon atoms and a basic aluminum carboxylate of a monobasic carboxylic acid of an aliphatic hydrocarbon having up to 18 carbon atoms, the molar ratio of basic aluminum carboxylate to aluminum trialcoholate being between about 0.33:1 and 2:1.

4. The process for acylating an aluminum trialcoholate which comprises heating to a temperature ranging from about 50° to 200° C. a mixture of an aluminum trialcoholate of an alcohol of an aliphatic hydrocarbon having up to 4 carbon atoms and an aluminum tricarboxylate of a monohydroxy substituted monobasic carboxylic acid of an aliphatic hydrocarbon having up to 18 carbon atoms, the molar ratio of aluminum tricarboxylate to aluminum trialcoholate being between about 0.1:1 and 1:1.

5. The process for acylating an aluminum trialcoholate which comprises heating to a temperature ranging from about 50° to 200° C. a mixture of an aluminum trialcoholate of an alcohol of an aliphatic hydrocarbon having up to 4 carbon atoms and a basic aluminum carboxylate of a monohydroxy substituted monobasic carboxylic acid of an aliphatic hydrocarbon having up to 18 carbon atoms, the molar ratio of basic aluminum carboxylate to aluminum trialcoholate being between about 0.33:1 and 2:1.

6. The process for acylating an aluminum trialcoholate which comprises heating to a temperature ranging from about 50° to 200° C. a mixture of an aluminum trialcoholate of an alcohol of an aliphatic hydrocarbon having up to 4 carbon atoms and an aluminum tricarboxylate of benzoic acid, the molar ratio of aluminum tricarboxylate to aluminum trialcoholate being between about 0.1:1 and 1:1.

7. The process for acylating an aluminum trialcoholate which comprises heating to a temperature ranging from about 50° to 200° C. a mixture of an aluminum trialcoholate of an alcohol of an aliphatic hydrocarbon having up to 4 carbon atoms and a basic aluminum carboxylate of benzoic acid, the molar ratio of basic aluminum carboxylate to aluminum trialcoholate being between about 0.1:1 and 1:1.

8. The process as claimed in claim 1 for which said carboxylic acid is stearic acid.

9. The process as claimed in claim 1 for which said carboxylic acid is 12-hydroxy stearic acid.

10. The process as claimed in claim 1 for which said carboxylic acid is oleic acid.

11. The process defined in claim 1, wherein the heating of the reactants is effected in the presence of an inert organic solvent.

12. The process defined in claim 1, wherein the heating of the reactants is effected in the presence of xylene.

13. The process defined in claim 1, including the further step of stabilizing the reaction products against destruction due to humidity by contacting the reaction products with volatile organic compounds capable of forming complexes with aluminum salts.

14. The product produced in accordance with the process of claim 1.

References Cited in the file of this patent

UNITED STATES PATENTS 2,801,190   Orthner et al. _____ July 30, 1957

FOREIGN PATENTS 519,092   Belgium _____ Apr. 30, 1953

OTHER REFERENCES

Eigenberger: "Fette u. Seifen," July 1942, pp. 505–8.
Gray et al.: Jour. Physical and Colloid Chem. 53 (1949).
Parry et al.: I, Trans. Faraday Soc. 46 (1950).
Parry et al.: II, Nature 164, 449 (1949).
McElvain et al.: Jour. Am. Chem. Soc. 73, 1400–2 (1951).
The Van Nostrand Chemist's Dictionary, D. Van Nostrand Co., N.Y. (1953), p. 173.